United States Patent [19]

van der Lely

[11] 4,136,973
[45] Jan. 30, 1979

[54] MOBILE DEVICE FOR TRANSPORTING LIQUID SUBSTANCES

[76] Inventor: Cornelis van der Lely, 7, Brüschenrain, Zug, Switzerland

[21] Appl. No.: 810,615

[22] Filed: Jun. 27, 1977

[30] Foreign Application Priority Data

Jul. 1, 1976 [NL] Netherlands ............ 7607261

[51] Int. Cl.² ............................................. B01F 5/10
[52] U.S. Cl. ................................. 366/219; 137/574; 239/74; 366/192
[58] Field of Search ............... 280/5 A, 5 C, 5 D, 5 E; 214/17; 114/74; 137/574, 576, 582, 581, 351; 239/74; 366/219, 240, 349, 341

[56] References Cited

U.S. PATENT DOCUMENTS

| | | | |
|---|---|---|---|
| 2,086,055 | 7/1937 | Taylor | 280/5 E X |
| 2,137,300 | 11/1938 | Allen | 137/574 |
| 2,664,911 | 1/1954 | Thompson et al. | 137/574 X |
| 3,054,525 | 9/1962 | Silvis | 280/5 D X |

Primary Examiner—Billy S. Taylor
Attorney, Agent, or Firm—Mason, Mason and Albright

[57] ABSTRACT

A cylindrical tank supported on the frame of a vehicle for transporting a mixture of manure and a further liquid, usually water. To prevent the agglomeration of solid and semi-solid materials within the tank, guide members are provided to produce recirculating and swirling motions of the mixture within the tank as the result of normal movements of the vehicle while carrying the tank during travel, such motions being produced primarily by deceleration of the vehicle. The main guide member is supported in the tank so as to be inclined downwardly to the rear whereby when the vehicle stops, the liquid mixture tends to surge forward up the inclined guide member. A second guide member extending from the top of the tank downwardly at an inclination opposite to that of the first guide member and above same tends to prevent liquid mixture which has surged into the forward portion of the tank from sloshing to the rear in the upper part of the tank. The forward part of the first guide member is curved downwardly coinciding with the surface of the cylinder to guide the forward surged liquid under the first guide member. A hinge at the rear of the first guide member permits a portion of the first guide member to be rotated upwardly by the returning liquid, the rearmost part of the hinged portion being proximate a rear discharge valve.

50 Claims, 6 Drawing Figures

MOBILE DEVICE FOR TRANSPORTING LIQUID SUBSTANCES

SUMMARY OF THE INVENTION

The invention relates to a mobile device for transporting liquid matter having a tank supported by a frame. More particularly, it relates to the disposition of guide members within the tank to promote mixing of the liquid matter therein during its transportation to inhibit the agglomeration of solids and semi-solids suspended in the liquid matter.

According to the invention at least one guide member is arranged in the tank for preventing dissociation of the mixture of liquid substances, said guide member being inclined downwardly to the rear and extending upwardly for only part of the height of the tank.

A second guide member is mounted above the first guide member transversely across the tank which is inclined downwardly towards the front of the tank. The first guide member includes a downwardly curved forward portion which conincides with the surface of a cylinder. The after part of the first guide member is hinged so as to be freely pivotable upwardly and its rearmost edge is adjacent the rear discharge outlet for the tank in its lower position. Optionally, a lower portion of the second guide member may be hinged to pivot forwardly, the lower edge of such portion resting on the first guide member when in its lowered position. A further guide member may be located under and parallel to the first guide member. Each guide member is mounted in the tank to leave openings between its edges and the interior walls of the tank.

The arrangement of guide members is such that when the vehicle carrying the tank stops, the liquid mixture therein surges forward due to its inertia and is guided in an upwardly inclined direction due to the inclination and position of the first guide member. However, a reverse surge is inhibited by the second guide member, particularly if a hinged portion is provided and the movement of the liquid matter thus tends to flow downwardly guided by the curved forward portion of the first guide member and then to flow under the first guide member to the rear of the tank. This motion of the liquid matter may cause the hinged after portion of the first guide member to be turned upwardly. The further guide member contributes to the guidance of the liquid matter flow under the first member. The openings between the guide members and the interior walls of the tank contribute to a swirling motion of the liquid matter and thus movement thereof along the walls of the tank. Thus, instead of a repetitive sloshing of the liquid matter back and forth as a result of deceleration of the vehicle, the liquid matter is recirculated so that it moves, relative to the vehicle, rearwardly along the bottom and sides of the tank and a distribution flow and turbulence in the liquid matter mixture results which counteracts the agglomeration of solids and semi-solids in such liquid mixture.

For a better understanding of the invention and to illustrate how the same may be carried into effect, reference is made by way of example to the accompanying drawing.

DESCRIPTION OF THE PREFERRED EMBODIMENTS

Figure 1:
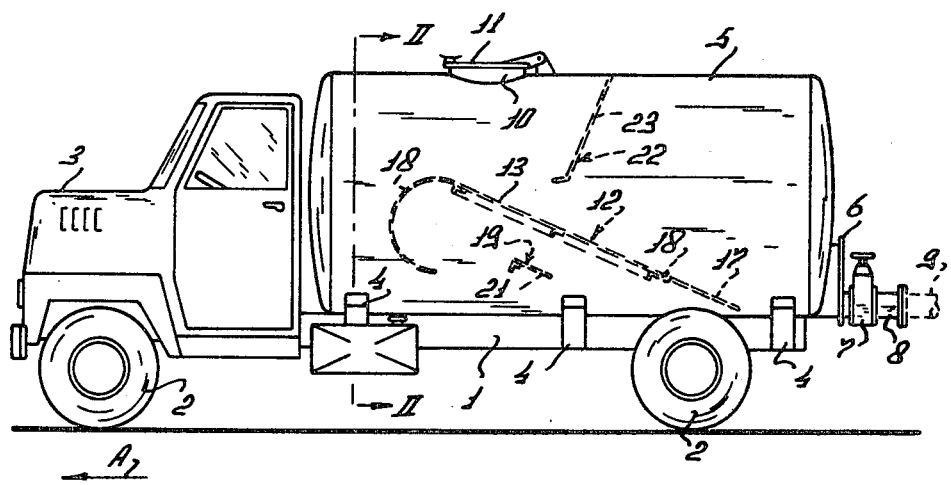
FIG. 1 is a side elevation of a first embodiment of a device in accordance with the invention.

FIG. 1 shows the construction of a mobile device for transporting liquid substances comprising a frame 1 which is supported by wheels 2 and which in turn supports a hood and forward motor compartment 3 accommodating an engine for propelling the device. Behind compartment 3 three supports 4 are provided on the frame in a direction transverse of the direction of usual movement A which carry a cylindrical tank 5. Near the rear of tank 5, an opening or manhole is provided which is covered by a manhole cover 6. An opening in manhole cover 6 is provided with a valve closing member 7. At the rear side of closing member 7 an outlet 8 is connected which is adapted to be coupled with, for example, a hose 9.

Near the top side of cylindrical tank 5 is a filling opening 10 which is closed by a pivotable cover 11. In a manner not shown frame 1 carries a pump which has the capacity to fill the tank by applying suction to a suitable source and to empty the tank by pressure.

Figure 3:
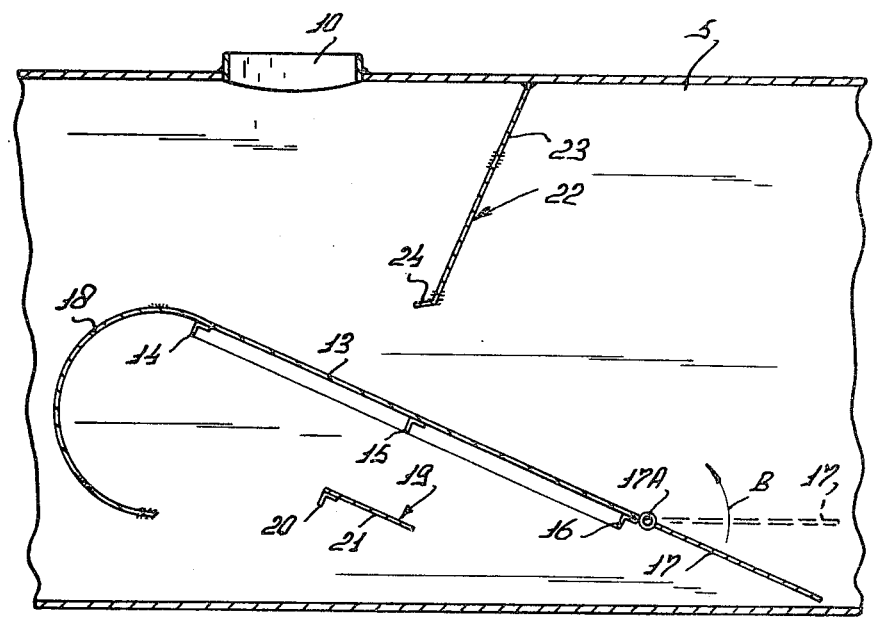
FIG. 3 is a sectional view taken on the lines III—III of FIG. 2.
Figure 2:
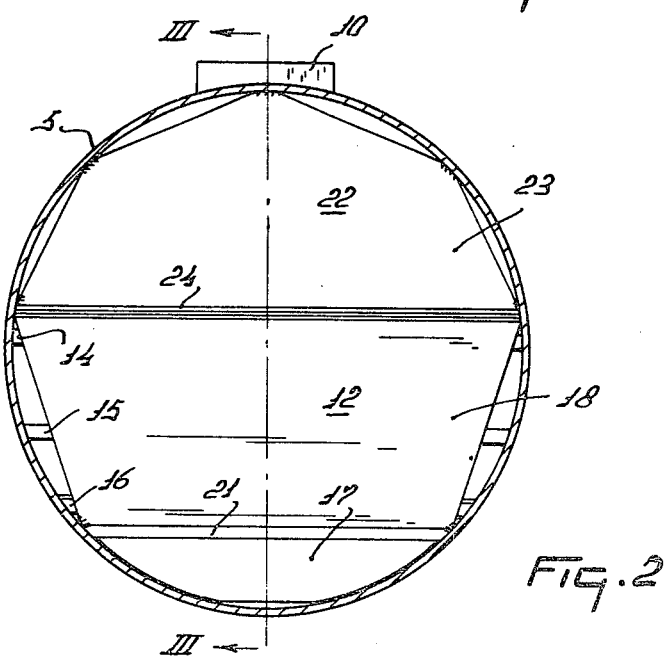
FIG. 2 is an enlarged sectional view taken on the lines II—II of FIG. 1.

Inside the tank a partition-shaped guide member 12 is provided for guiding movement of liquid substances received therein. Partition 12 has a plate-shaped portion 13, which is at an acute angle of about 20° to 50°, preferably at about 30° relative to the longitudinal center line of cylindrical tank 5, said angle opening to the front as viewed in the usual direction of movement A. This longitudinal center line is preferably substantially horizontal or is at a minimal angle to the horizontal which opens to the front. Portion 13 has a length approximately corresponding with one-half the length of tank 5. It is arranged in tank 5 with the aid of three angularly profiled angle beams 14, 15 and 16 (FIG. 3). These beams 14, 15 and 16 are connected with the sidewall of the tank, whereas partition 13, as shown in FIG. 2, has straight flat edges, openings being left between the interior sidewall of the tank and the side edges of partition 13. This also applies to the lower side edge of the guide wall 12 formed by a pivotable portion 17 which is adapted to turn with respect to the stationary portion of guide wall 12 about a substantially horizontal pivotal shaft 17A extending transversely of the usual direction of movement. Near pivotal shaft 17A guide wall 12 has a horizontal dimension which is about 75 percent of the diameter of tank 5. Portion 17 is turnable about shaft 17A, under the action of a fluid stream in a direction indicated by the arrow B whereas in the opposite direction a stop formed by the bottom of tank 5 or, if necessary, provided near beam 16 ensures that portion 17 in the lowermost position shown in FIG. 3 is aligned with main portion 13. Near its lower side edge pivotable portion 17 is straight consisting of a chord relative to the circumference of the interior of tank 5 so that between the lower boundary of portion 17 and the curved bottom of tank 5 an arcuate opening is defined. Portion 17 is arranged near the rear of the tank so that the outlet opening or the manhole covered by cover 6 is located a relatively short distance behind same. Near the front side of guide member 12, portion 13 merges into a portion 18 which curves downwardly through an arc of at least 180°. As is shown in FIG. 3, curved portion 18 coincides through an arc of about 210° with a cylindrical surface. At its lowermost aspect, curved portion 18 is about the same height above the bottom of tank 5 as pivotal shaft 17A. In the front view of FIG. 2, guide member 12 has a substantially trapezoidal shape. Approximately under the center of main portion 13 as seen from the side an auxiliary guide member 19 is supported by an angle beam 20 similar to beams 14, 15 and 16. Auxiliary guide member 19 comprises a planar plate-shaped wall 21, which is substantially parallel to the planar main portion 13 of guide wall 12.

Above wall 12 is located an upper guide member 22 connected on the interior of tank 5 at the top and extending therefrom in a downwardly and forwardly inclined position. Guide member 22 includes a partition 23 which is disposed at an obtuse angle opening to the front relative to the longitudinal center line of tank 5 and which is perpendicular to the vertical plane of symmetry of tank 5. Said obtuse angle is about 100° to 120°, preferably 110°. Partition 23 is spaced a distance above portion 13. On its lower side, partition 23 terminates in a substantially horizontal forwardly extending flange portion 24. As shown in the elevational view of FIG. 2, partition 23 is fastened at five points to the wall of tank 5. Thus, upper guide member 22 has the shape of a pentagon, the sides of which define chords along the interior circumgerence of tank 5. Also in this case spaces for arcuate openings are defined between the outer edges of guide member 22 and the wall of tank 5.

Figure 4:
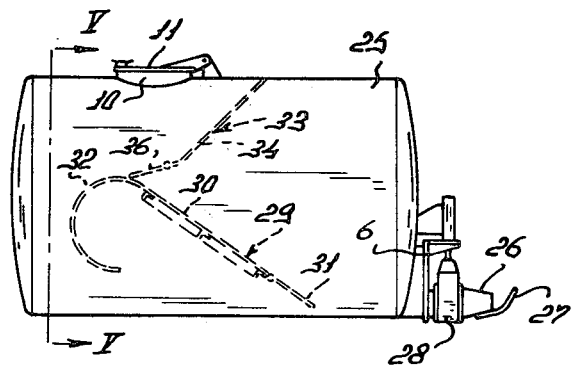
FIG. 4 is a side elevation of a second embodiment of a tank associated with the device in accordance with the invention.
Figure 6:
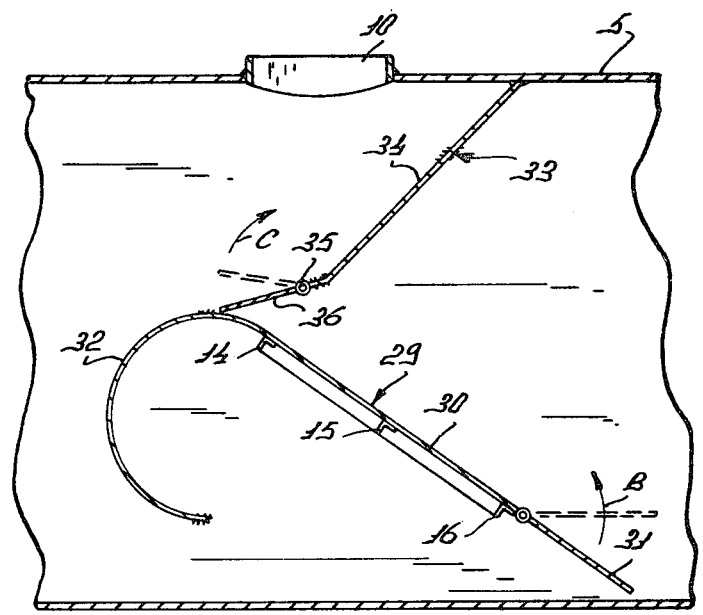
FIG. 6 is a sectional view taken on the lines VI—VI of FIG. 5.

In the embodiment shown in FIG. 4 a tank 25, which may be substituted for tank 5 on an appropriately dimensioned frame 5, is provided at its rear with a spreading device which functions to distribute thick liquid matter such as mixed manure, said device being formed by a funnel-shaped outlet 26 and a spreading plate 27. Between the spreading device and the tank is provided a hydraulically operable valve closing member 28. Inasmuch as tank 25 has a shorter relative length than the tank 5 (its length is about 70 percent of the length of tank 5), its guide member 29 has a portion 30 which is, as compared with the portion 13, disposed at a slightly greater angle, preferably 35°, relative to the horizontal plane and it also has a slightly shorter length than portion 13. The height of portion 30 is, like portion 13, about one-half the height of tank 25. Essentially the same similarity exists for pivotable portion 31 relative to pivotable portion 17 and a curved portion 32 which is shaped substantially the same as curved portion 18. Above portion 30 is arranged a second guide member 33 which has a slightly greater obtuse angle relative to a horizontal plane than guide member 22 of the first embodiment. The obtuse angle for member 33 is about 135°. Guide member 33 comprises a partition 34 which, like partition 23, is inclined downwardly and forwardly away from the interior top side of the tank to near the upper side of guide member 29. Near its lower end, partition 34 has pivotably connected thereto a pivotable portion 36 by means of a horizontal pivotal shaft 35 extending substantially transversely of the usual direction of movement A. Pivotable portion 36 bears, in its lowermost position, on the top side of the curved portion 32 and is capable of being turned upwardly by the action of a fluid stream moving in the direction of the arrow C (FIG. 6).

Figure 5:
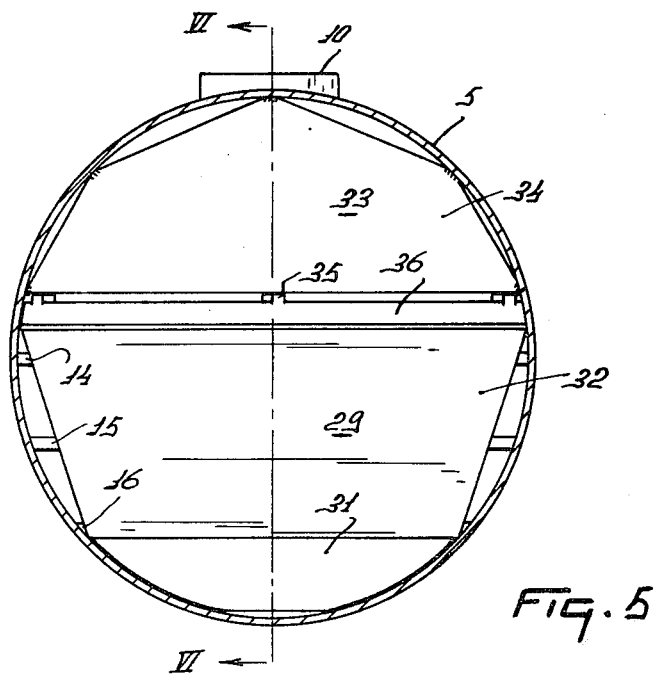
FIG. 5 is an enlarged sectional view taken on the lines V—V of FIG. 4.

As shown in the elevational view of FIG. 5, guide member 29, like guide member 12, has a trapezoidal shape and the guide member 33, like the guide member 22, is rigidly secured at five places to the interior wall of tank 25. In this way a plurality of openings are defined between guide members 29 and 33 and the interior surface of the wall of tank 25 for passing the fluid stream.

The embodiments described above operate as follows.

To introduce fluid into tanks 5 or 25 a hose is connected with outlet 8, or for tank 25, after removal of the spreading device formed by funnel 26 and plate 27, to the outlet valve 28 after which the suction sides of the pumps provided for the tanks is connected with tank 5 or tank 25, respectively. Fluid thus drawn into the tanks via the connected hoses. As an alternative tank 5 or tank 25 may be filled through opening 10 at its top. When the tank is filled, fluid therein is transported to where it is desired to discharge or distribute same. It is understood that the device may be employed not only for transporting liquid matter, but as is shown by the second embodiment, the device may also be used for broadcasting the liquid matter contained therein; such matter which may consist of a thick liquid manure mixture. For broadcasting the fluid is ejected from the tank by pressure therein against spreading plate 27.

In the case of cylindrical tanks such as the tanks 5 and 25 according to the invention the transport of liquid matter sensitive to disintegration of the mixture frequently involves the problem that sand (or similar substances having a specific density which substantially exceeds that of the liquid manure mixture) accumulates on the tank bottom near the side remote from the outlet. This is particularly likely to occur in the transport of liquid substances mixed with refuse fragments which may agglomerate and hence cause very serious clogging problems. According to the invention one or more guide members in the form of partitions are incorporated in the tank, which guide members produce a recirculating motion including swirling and whirling movements such as eddies and vortexes in the fluid in the tank during acceleration and more particularly during deceleration by the vehicle which carries same so that disintegration of the mixture is avoided. Thus, the risk of dissocation of the mixture is obviated in a simple and inexpensive manner. The partitions forming the guide members are preferably made from thin steel sheet, but other materials causing only little friction between the fluid and the guide members may also be used. Moreover, profiled beams may be provided in the direction of length of the guide members for enhancing the whirling effect. The partitions and beams augment the strength of the tank whereby it is less likely to collapse or rupture due to pressure differential between the inside and outside of the tank.

By the dispostion of second guide members 22 or 33, above the corresponding first guide members 12 or 29 the fluid is compelled to move upwardly between the two guide members during deceleration of the device, while at the same time, curved portions 18 or 32 cause the fluid to revolve so that solid constituents in the fluid remain adequately mixed. The mode of disposition of the guide members in the tank is important. It is advantageous to provide at least one of the guide members with a partially movable portion. This is achieved by providing pivotable portions 17 and 31, which permit the fluid to pass to the rear and block the return thereof. Thus, a rotary, recirculating movement of the liquid substances in the tank is produced. To contribute to the movement by the liquid substances in the tank 5 auxiliary guide member 19 is arranged beneath guide member 12. It should be noted that the position of the guide members may also be dependent upon the length of the tank.

With the outlet opening of the tank arranged directly behind the guide member, the fluid is enabled to flow from the tank without being dissociated.

One or more of the guide members may be arranged in the tank so as to be movable as a whole rather than in part, which additionally enhances the continual mixing of the fluid during its transportation. This also may contribute to cleaning of the tank's interior.

Although the preferred embodiments of the invention are disclosed in this application, it will be understood that it is capable of other modifications and adaptations within the scope of the following claims which should therefore be construed not only to cover the disclosed structure and acts, but also equivalents thereof.

Having thus described my invention, what I claim as new and desire to secure by Letters Patent of the United States is:

1. A mobile device for transporting a mixture of a liquid and further substances, said device comprising a tank, a frame supporting said tank, at least one guide member arranged in said tank at an acute angle to a horizontal plane, said angle opening to the front as viewed in the usual direction of movement of the device, said guide member cooperating with movement of the device during transportation for performing the function of preventing dissociation of the mixture of liquid and further substances in said tank, said guide member extending within said tank for only part of the height of said tank.

2. A device as claimed in claim 1 wherein said guide member is formed by an at least substantially closed partition extending across said tank.

3. A device as claimed in claim 2 including pivot means connected to said guide member wherein at least a portion of said guide member is adapted to pivot about said pivot means with respect to a further portion of said guide member.

4. A device as claimed in claim 2 wherein, viewed in said direction of movement, said guide member is curved near its front in downward direction.

5. A device as claimed in claim 4 wherein said guide member is curved through at least 180°.

6. A device as claimed in claim 5 wherein said curved portion of said guide member substantially defines a cylindrical surface in substantial part.

7. A device as claimed in claim 2 wherein said guide member includes a foremost portion and a rearmost portion relative to its normal direction of movement and the foremost portion of said guide member is spaced a substantial distance above said tank bottom relative to the rearmost portion of said guide member.

8. A device as claimed in claim 7 wherein pivot means is provided in said rearmost portion of said guide member viewed in said direction of movement whereby said rearmost portion is pivotable relative to the remainder of said guide member.

9. A device as claimed in claim 8 wherein a stop is provided to limit the pivotal movement of said rearmost portion in a downward direction.

10. A device as claimed in claim 7 wherein said guide member extends substantially across the entire width of said tank.

11. A device as claimed in claim 10 wherein a flow passage is provided between the lower portion of said guide member and the bottom of said tank.

12. A device as claimed in claim 11 wherein a further flow passage is provided between said guide member and the interior surface of said tank.

13. A device as claimed in claim 7 wherein at least the major portion of said guide member is in a fixed position relative to said tank.

14. A device as claimed in claim 13 wherein a second guide member is disposed above said first mentioned guide member and so located whereby said second guide member cooperates with the first mentioned guide member to prevent dissociation of the mixture of liquid and further substances in said tank.

15. A device as claimed in claim 14 wherein said second guide member comprises a pivotable portion.

16. A device as claimed in claim 15 including a horizontal pivotal shaft wherein said pivotable portion of said second guide member turns about said horizontal pivotal shaft which is mounted in said tank to extend substantially transversely of said direction of movement.

17. A device as claimed in claim 16 wherein the turning movement of said pivotable portion of the second guide member about said pivotal shaft in downward direction is limited by contacting said first mentioned guide member.

18. A device as claimed in claim 17 wherein said second guide member in its lowermost position joins said first mentioned guide member.

19. A device as claimed in claim 14 wherein said second guide member is at an obtuse angle to a horizontal plane opening to the front, viewed in the direction of said movement, said horizontal plane intercepting a lower part of said second guide member and said obtuse angle being defined between said horizontal plane and that part of said second guide member extending above said horizontal plane.

20. A device as claimed in claim 19 wherein said first mentioned guide member and said second guide member are at an angle of about 80° relative to each other.

21. A device as claimed in claim 7 wherein an auxiliary guide member is arranged beneath said first mentioned guide member.

22. A device as claimed in claim 21 wherein said auxiliary guide member extends parallel to at least the portion of said first mentioned guide member which is located above said auxiliary guide member.

23. A device as claimed in claim 4 wherein a second guide member mounted at a bias in said tank joins said first mentioned guide member in the proximity of said curved portion.

24. A device as claimed in claim 2 wherein said tank is cylindrical in shape and has completely closed walls.

25. A device as claimed in claim 2 wherein an opening is defined between the interior wall of said tank and said guide member.

26. A device as claimed in claim 2 wherein an outlet opening from said tank with means for closing same is provided in the rear of said tank which is located in the proximity of the rearmost portion of said guide member.

27. A device as claimed in claim 2 wherein means is provided at the rear of said tank for spreading said mixture when it is discharged from said tank.

28. A mobile device for transporting liquid matter which comprises a frame; a tank supported on said frame; first and second liquid guide means mounted within said tank; said guide means both extending across the breadth of said tank; said first guide means being inclined upwardly in the direction of usual movement of the device from proximate the bottom of said tank to at least about the midheight of said tank, said first guide means extending substantially the length of said tank but being spaced from the forward wall thereof; said second guide means being disposed above said first guide means and being inclined downwardly in the direction of usual movement of the device from proximate the top of said tank to at least about the mid-height of said tank, whereby upon deceleration of the device the movement of liquid matter in said tank is guided initially forward above said first guide means and thereafter is influenced to flow rearwardly under said first guide means thus producing a recirculating motion of the liquid matter in said tank.

29. A device as claimed in claim 28 wherein said first guide means comprises a forward portion which is curved downwardly to provide guidance for the movement of said liquid matter from the forward part of said tank as a result of deceleration of said vehicle downwardly to under said first guide means.

30. A device as claimed in claim 28 including hinge means wherein said first guide means comprises a rearward portion which is hinged by said hinge means to the remainder of said first guide means whereby it pivots upwardly as a result of the flow of said liquid matter rearwardly relatively to said tank under said first guide means.

31. A device as claimed in claim 28 including hinge means wherein said second guide means comprises a lower portion which is hinged by said hinge means to the remainder of said second guide means and is arranged to pivot forwardly relative to said tank as a result of the flow of said liquid matter forwardly relative to said tank above said first guide means.

32. A device as claimed in claim 28 wherein said tank is cylindrical in shape and has a discharge outlet immediately to the rear of the rearmost portion of said first guide means.

33. A device as claimed in claim 28 wherein a further guide means provided under said first guide means to guide said liquid matter flowing to the rear relative to said tank under said first guide means.

34. A device as claimed in claim 28 wherein openings are provided proximate the edges of said first guide means for the flow of said liquid matter therethrough adjacent the walls of said tank.

35. A device as claimed in claim 32 wherein means is provided at the rear of said tank for spreading said mixture when it is discharged from said tank.

36. A device as claimed in claim 28 wherein said second guide means comprises a lower portion which is hingably connected to the remainder of said second guide means by a transverse horizontal pivot member and is arranged to pivot forwardly relative to said tank as a result of the flow of said liquid matter forwardly relative to said tank above said first guide means.

37. A device as claimed in claim 36 wherein the turning movement of said pivotable portion of said second guide means in a downward direction is limited by stop means formed by said first guide means.

38. A device as claimed in claim 37 wherein said second guide means in its lowermost position joins said first guide means.

39. A device as claimed in claim 28 wherein said first guide means and said second guide means are at an angle of about 80° relative to each other.

40. A device as claimed in claim 28 wherein a further guide means is provided under said guide means to guide liquid material flowing to the rear relative to said tank under said first guide means.

41. A device as claimed in claim 40 wherein said further guide means extends parallel to at least the portion of said first guide means which is located above said further guide means.

42. A mobile device for transporting liquid matter which comprises a frame, a tank supported on said frame, liquid guide means mounted within said tank extending substantially across the width of said tank and being inclined in the direction of usual movement of the device from proximate the bottom of said tank to at least about the midheight of said tank, a flow passage being provided between the lower position of said guide means and the bottom of said tank, whereby upon deceleration of the device the movement of liquid matter in said tank is guided initially forward above said guide means thus producing a recirculating motion of the liquid matter in said tank.

43. A device as claimed in claim 42 wherein said guide means is formed by at least a substantially closed partition.

44. A device as claimed in claim 42 wherein said guide means comprises a rearward portion which is hingably connected to the remainder of said guide means by a horizontal pivot member whereby it pivots upwardly as a result of the flow of said liquid matter rearwardly relative to said tank under said first guide means.

45. A device as claimed in claim 44 wherein a stop is provided to limit the pivotal movement of said rearmost portion in a downward direction.

46. A device as claimed in claim 42 wherein openings are provided proximate the edges of said guide means for the flow of said liquid matter therethrough adjacent the walls of said tank.

47. A device as claimed in claim 42 wherein said guide means comprises a forward portion which is curved downwardly to provide guidance for the movement of said liquid matter from the forward part of said tank as a result of deceleration of said vehicle downwardly to under said guide means.

48. A device as claimed in claim 47 wherein said guide means is curved through at least 180°.

49. A device as claimed in claim 47 wherein a second guide means is mounted at a bias in said tank, said second second guide means joining said first mentioned guide means in the proximity of said curved portion.

50. A device as claimed in claim 42 wherein a second guide means is disposed above said first mentioned guide means and so located whereby said second guide means cooperates with said first mentioned guide means to prevent dissociation of the mixture of liquid and further substances in said tank.

* * * * *